(12) United States Patent
Serban et al.

(10) Patent No.: US 10,634,636 B2
(45) Date of Patent: Apr. 28, 2020

(54) RELATIVE HUMIDITY SENSOR AND METHOD

(71) Applicant: Honeywell International Inc., Morris Plains, NJ (US)

(72) Inventors: Bogdan-Catalin Serban, Bucharest (RO); Mihai Brezeanu, Bucharest (RO); Octavian Buiu, Bucharest (RO); Cornel P. Cobianu, Bucharest (RO)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/423,349

(22) Filed: Feb. 2, 2017

(65) Prior Publication Data

US 2017/0248537 A1  Aug. 31, 2017

(30) Foreign Application Priority Data

Feb. 29, 2016 (EP) .................................. 16157892

(51) Int. Cl.
*G01N 27/22* (2006.01)

(52) U.S. Cl.
CPC ......... *G01N 27/225* (2013.01); *G01N 27/226* (2013.01)

(58) Field of Classification Search
CPC .... G01N 27/22; G01N 27/121; G01N 27/125; G01N 27/126; G01N 27/221; G01N 27/223; G01N 27/225; G01N 27/226; G01N 27/227; G01N 27/228
USPC ................... 73/29.02, 335.04; 324/664, 689; 361/286
See application file for complete search history.

(56) References Cited

U.S. PATENT DOCUMENTS

| | | | | |
|---|---|---|---|---|
| 4,603,372 A * | 7/1986 | Abadie | ................ | G01N 27/225 257/467 |
| 4,965,698 A | 10/1990 | Thoma et al. | | |
| 5,161,085 A * | 11/1992 | Sakai | ................... | G01N 27/225 361/286 |
| 5,408,381 A * | 4/1995 | Thoma | ................. | G01N 27/225 29/25.42 |
| 6,114,863 A * | 9/2000 | Krahn | .................... | G01N 27/02 324/664 |

(Continued)

FOREIGN PATENT DOCUMENTS

EP          2420826 A1     2/2012
WO    WO-2009153204 A1 * 12/2009

OTHER PUBLICATIONS

Machine Translation for WO2009/153204, Vergelati, Caroll, "Composition Containing a Polyamide Matrix and Lignin", Dec. 23, 2009 (Year: 2009).*

(Continued)

*Primary Examiner* — Steven L Yeninas
(74) *Attorney, Agent, or Firm* — Alston & Bird LLP

(57) ABSTRACT

A relative humidity sensor is disclosed. The relative humidity sensor includes a first electrode and a second electrode disposed above a dielectric substrate. A humidity sensitive layer is disposed above at least one of the first electrode and the second electrode, where the humidity sensitive layer comprises a curable composition comprising cellulose acetate butyrate and a hydrophobic filler. In some embodiments, a dust protection layer is disposed above the humidity sensitive layer.

10 Claims, 4 Drawing Sheets

(56) References Cited

U.S. PATENT DOCUMENTS

| | | | |
|---|---|---|---|
| 6,615,659 B2* | 9/2003 | Shibue | G01N 27/121 |
| | | | 324/664 |
| 2003/0107385 A1* | 6/2003 | Shon | G01N 27/121 |
| | | | 324/694 |
| 2003/0179805 A1* | 9/2003 | Hamamoto | G01N 27/225 |
| | | | 374/16 |
| 2004/0177685 A1* | 9/2004 | Yokura | G01N 27/225 |
| | | | 73/335.04 |
| 2004/0254306 A1* | 12/2004 | Isogai | G01N 27/121 |
| | | | 525/435 |
| 2009/0056439 A1* | 3/2009 | Suzuki | G01N 27/223 |
| | | | 73/335.02 |
| 2010/0307238 A1* | 12/2010 | Van Popta | G01N 27/225 |
| | | | 73/335.04 |
| 2012/0071362 A1* | 3/2012 | Nhan | G01N 33/0047 |
| | | | 506/33 |
| 2013/0336842 A1* | 12/2013 | Grange | G01N 27/223 |
| | | | 422/90 |
| 2014/0125359 A1* | 5/2014 | El-Gamal | G01N 27/223 |
| | | | 324/664 |
| 2015/0168330 A1* | 6/2015 | Gryska | G01N 27/223 |
| | | | 324/663 |
| 2018/0031510 A1* | 2/2018 | Beck | G01N 27/225 |

OTHER PUBLICATIONS

"European Application Serial No. 16157892.7, Extended European Search Report dated Aug. 12, 2016", 7 pgs.

Serban, et al., "Talc-Impregnated Polyimide fol-lhumidity Sensors with Improved Hysteresis", Cas 2013 International Semiconductor Conference, IEEE, (Oct. 12, 2015)[retrieved Jul. 1, 2019] retrieved from the Internet <https://www.researchgate.net/publication/308853501_Talc-mpregnated_polyimide_for_humidity_sensors_with_improved_hysteresis>, pp. 109-112.

Grange et al., "A Capacitive Humididty Sensor With Very Fast Response Time and Very Low Hysteresis", Sensors and Actuators, Elsevier, Switzerland, vol. 12, No. 3, (Oct. 1, 1987), [retrieved Jul. 1, 2019], retrieved from the Internet<https://www.sciencedirect.com/science/article/pii/0250687487800434>, pp. 291-296.

* cited by examiner

RELATIVE HUMIDITY SENSOR AND METHOD

RELATED APPLICATIONS

This application claims the benefit of priority under 35 U.S.C. Section 119 to European Patent Application Serial No. 16157892.7, filed on Feb. 29, 2016, which application is incorporated herein by reference in its entirety.

BACKGROUND

Relative humidity sensors can be used in various domestic and industrial environments. For example, relative humidity sensors can be used for control of the living environment in buildings, textiles and paper manufacturing, food processing, the medical field, the automotive industry, pharmaceutical processing, agriculture, and chemical gas purification, among others.

SUMMARY

A relative humidity sensor is disclosed. The relative humidity sensor includes a first electrode and a second electrode disposed above a dielectric substrate, a humidity sensitive layer disposed above at least one of the first electrode and the second electrode, the humidity sensitive layer comprises a curable composition comprising cellulose acetate butyrate and a hydrophobic filler. In some embodiments, the relative humidity sensor further comprises a dust protection layer disposed above the humidity sensitive layer. In some embodiments, the curable composition comprising cellulose acetate butyrate and a hydrophobic filler is a cured composition comprising cellulose acetate butyrate and a hydrophobic filler.

In one embodiment, a method of forming a relative humidity sensor comprises depositing and patterning a first electrode on a dielectric substrate, applying a composition to an upper surface of the first electrode to form a humidity sensitive layer, the composition comprising cellulose acetate butyrate and a hydrophobic filler, and depositing and patterning a second electrode on an upper surface of the humidity sensitive layer. In some embodiments, the method further comprises depositing a dust protection layer on an upper surface of the second electrode.

In another embodiment, a method of forming a relative humidity sensor comprises preparing a composition, the composition comprising cellulose acetate butyrate and a hydrophobic filler, and depositing at least a portion of the composition on a dielectric substrate supporting a first electrode and a second electrode, wherein the first and second electrodes are interdigitated, to form the relative humidity sensor.

DETAILED DESCRIPTION OF THE DRAWINGS

The embodiments of the present disclosure will be described, by way of example only, by reference to the FIGS. 1-5 of the accompanying drawing in which.

DETAILED DESCRIPTION

The present disclosure is directed toward a relative humidity sensor and a method for making the relative humidity sensor. The relative humidity sensor can incorporate a moisture humidity sensitive layer formed from a composition comprising cellulose acetate butyrate and a hydrophobic filler. The hydrophobic filler can, in an example, be an organic compound, such as a lignin or barium sulphate. In an example, the hydrophobic filler can be an inorganic compound, such as talc. The relative humidity sensor can, in an example, be formed in stacked configuration or in an interdigitated configuration.

Capacitive sensors are commonly used at least due in part to their linear response. That is, the amount of water absorbed, which is proportional to the relative humidity of the environment, is linearly proportional to the change of the dielectric constant of the insulating polymer of the capacitive sensor. Previous and current capacitive sensors can suffer from hysteresis. Previous approaches have attempted to mitigate the hysteresis problem by incorporation of hydrophobic carbon black within the polymer. However, carbon black is not fully compatible with polymer matrices. The present disclosure provides a relative humidity sensor including a humidity sensitive layer formed of cellulose acetate butyrate and a compatible hydrophobic filler, so as to reduce the hysteresis by more than 50% (e.g., from about 50% to about 100%; about 60% to about 90%; about 70% to about 95%; about 80% to about 99%; or about 75% to about 100%) with respect to previous solutions based on carbon black incorporation.

While not wishing to be bound by any specific theory, it is believed that the hydrophobic filler makes the sensing layer more hydrophobic and thus the chance of forming water clusters as a function of relative humidity (RH) increase is decreased significantly. A more hydrophobic humidity sensitive layer will have a smaller dielectric constant variation as a function of the relative humidity increase and a smaller capacitance variation between 0% RH and 100% RH. Even if the changes in the dielectric constant as a function of RH can be smaller than 10-20%, the impact on hysteresis can be much higher. As mentioned herein, the hysteresis can be reduced by more than 50% by incorporating the hydrophobic fillers of the various embodiments described herein.

Figure 1:
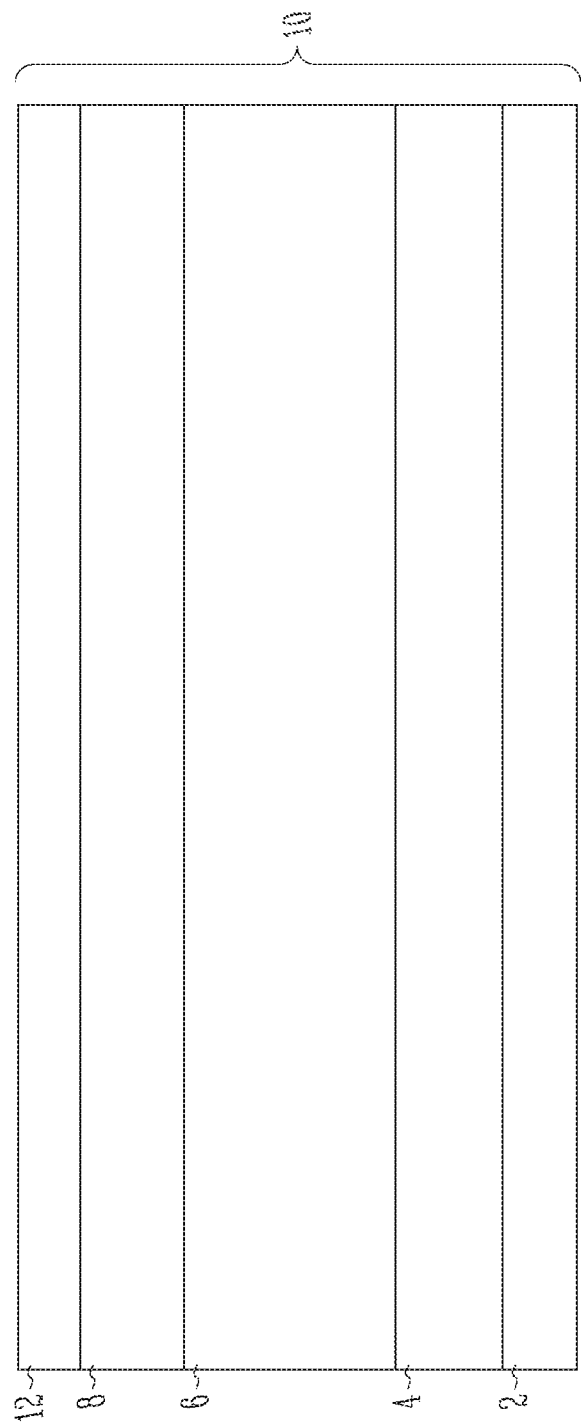
FIG. 1 shows a cross-sectional view of a relative humidity sensor, in accordance with at least on example.

FIG. 1 shows a cross-sectional view of a relative humidity sensor 10 (hereinafter "sensor 10"), in accordance with at least one example. The sensor 10 illustrated in FIG. 1 is a stacked configuration, but examples are not so limited (e.g., FIGS. 2 and 3). The sensor 10 can include a dielectric substrate 2. In an example, the dielectric substrate 2 can be formed of a flexible dielectric material such that the dielectric substrate 2 can conform to non-planar surfaces. In another example, the dielectric substrate 22 is not flexible. The dielectric substrate 2 can include a polymer, such as cellulose acetate butyrate. The dielectric substrate 2, in an example, can be formed from commercially available cellulose acetate butyrate, such as is available from Eastman (Kingsport, Tenn.) (with thickness from 1 to 2 μm). The sensor 10 can include a first electrode 4 and a second electrode 8. In an example, the first electrode 4 and the second electrode 8 can have the same composition or can be formed of different compositions. In an example, the first electrode 4, the second electrode 8, or both is formed from a conductive polymer, such as a polymer including conductive carbon (e.g., carbon black), with thickness from 1 to 2 μm for layers deposited by, e.g, maskless, direct printing. In an example, the first electrode 4, the second electrode 8, or both are formed from conductive Kapton®. The first electrode 4, the second electrode 4, or both can be a conductive material such as metal (e.g., titanium, platinum or a titanium/platinum alloy).

As shown in FIG. 1, the sensor 10 can include a humidity sensitive layer 6, of thickness, e.g., from 1 to 2 μm for layers deposited by spin coating or maskless direct printing. The humidity sensitive layer 6 can be formed from a curable composition comprising cellulose acetate butyrate and a hydrophobic filler. In some embodiments the curable composition consists of only cellulose acetate butyrate. The cellulose acetate butyrate can be any suitable polymer of the formula:

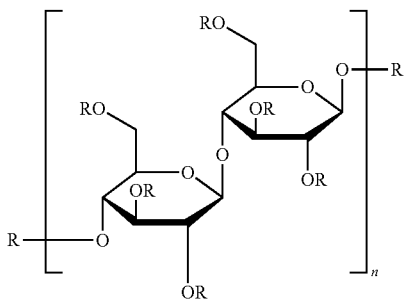

wherein R is hydrogen, acetate (—C(O)CH$_3$) or butyrate (—C(O)CH$_2$CH$_2$CH$_3$); and n is an integer such that the molecular weight of the cellulose acetate butyrate is from about 12,000 g/mol to about 70,000 g/mol (e.g., from about 12,000 g/mol to about 60,000 g/mol; about 30,000 g/mol to about 65,000 g/mol; and about 15,000 to about 55,000 g/mol).

As discussed herein, the composition can be prepared by mixing the cellulose acetate butyrate with the hydrophobic filler (e.g., a solution of cellulose acetate butyrate in a suitable organic solvent is mixed with the hydrophobic filler). The composition can include about 5% to about 15% by weight of a hydrophobic filler based on a total weight of the composition (e.g., about 5% to about 10%; about 8% to about 14%; about 10% to about 15%; or about 5% to about 8% by weight of a hydrophobic filler based on a total weight of the composition).

In an example, the hydrophobic filler can include an organic compound such as Viton and lignin. The organic compound can, in an example, include one or more lignin of varying molecular weights. One possible benefit of including lignin in the composition can include reducing water up-take of the humidity sensitive layer 6 formed from the composition. In an example, the lignin can have an average molecular weight from about 400 g/mol to about 1,100 g/mol (e.g., about 500 g/mol to about 1,000 g/mol; about 600 g/mol to about 800 g/mol; or about an average molecular weight of about 500 g/mol to about 1000 g/mol). The composition can include about 5% to about 15% by weight lignin based on a total weight of the composition (e.g., about 5% to about 10%; about 8% to about 14%; about 10% to about 15%; or about 5% to about 8% by weight lignin based on a total weight of the composition).

In an example, the hydrophobic filler can include an inorganic compound. The inorganic compound can, in an example include at least one of calcium carbonate, barium sulphate, talc, synthetic fluorine mica, and wollastonite. One possible benefit of including, e.g., talc (e.g., talc nanoparticles having at least one dimension in the range of about 1 nanometer (nm) to about 100 nm), in the composition is that the filler can increase the hydrophobicity of the cellulose acetate butyrate used in forming the humidity sensitive layer 6, and finally decrease its hysteresis. While not wishing to be bound by any specific theory, to hysteresis decrease can be explained by a much lower amount of water vapors incorporated as liquid-phase water clusters in the more hydrophobic sensing film. For such more hydrophobic sensing film, without liquid-phase water clusters inside, the dielectric constant will increase much slower as a function of relative humidity increase, and the same will happen with the capacitance of the sensor as a function of the RH increase. But the hysteresis will be decreased significantly. Lower range in the capacitance variation as a function of RH variation may be solved by the increase in the amplification of the electronic amplifier for signal processing. The composition can include about 5% to about 15% by weight of a hydrophobic filler based on a total weight of the composition (e.g., about 5% to about 10%; about 8% to about 14%; about 10% to about 15%; or about 5% to about 8% by weight of a hydrophobic filler based on a total weight of the composition).

As shown in FIG. 1, the sensor 10 can include, in some embodiments, a dust protection layer 12 disposed above the humidity sensitive layer 6, with thickness of, for example, 1 to 2 μm. In an example, the dust protection layer 12 is formed from a polymer, such as a cellulose acetate butyrate. The dust protection layer 12 acts, in some embodiments, as a barrier against dust and in the same time it is porous enough to allow air and humidity to reach the sensing layer without affecting the response time of the sensor. This dust protection layer can be formed from the same or different material as the dielectric substrate 2. In an example, due its higher porosity with respect to sensing layer, the dust protection layer 12 can have a lower capacitance than humidity sensitive layer 6. The dust protection layer 12 can, in an example, be formed from commercially available Kapton®.

As discussed herein, FIG. 1 illustrates the sensor 10 in a stacked configuration. A stacked configuration can include the second electrode 8 disposed above the first electrode 4. As shown, the first electrode 4 and the second electrode 8 are separated by the humidity sensitive layer 6. The humidity sensitive layer 6 can be in electrical contact with the first electrode 4 and the second electrode 8. That is, the sensor 10 can include a stacked configuration, from bottom to top, including the dielectric substrate 2, the first electrode 4, the humidity sensitive layer 6, the second electrode 8, and the dust protective layer 12, when the dust layer is present. Although the sensor 10 is shown as having a rectangular cross-sectional geometry, examples are not so limited. In an example, the sensor 10 can include a tapered configuration, such as a taper from bottom to top or top to bottom.

Figure 2:
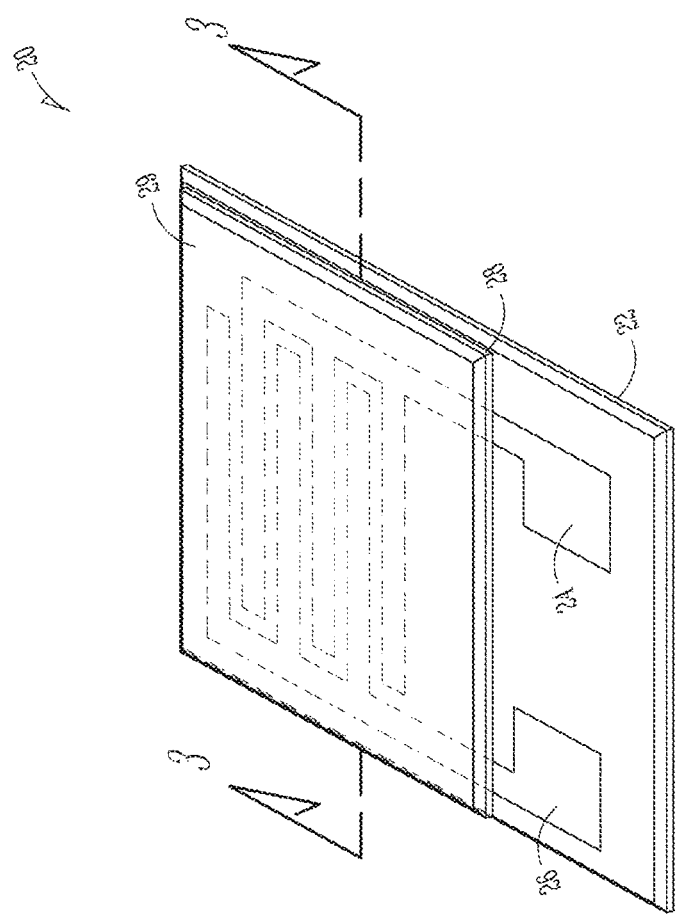
FIG. 2 shows a partial cut-away perspective view of a relative humidity sensor, in accordance with at least one example.

FIG. 2 shows a partial cut-away perspective view of a relative humidity sensor 20 (hereinafter also referred to as "sensor 20"), in accordance with at least one example. The sensor 20 is similar to sensor 10 as described in relation to FIG. 1, but illustrates an interdigitated configuration. For example, the sensor 20 can include a dielectric substrate 22, similar to the dielectric substrate 2 described in relation to FIG. 1.

As shown in the example of FIG. 2, the sensor 20 can include interdigitated electrodes (IDEs), including the first electrode 24 and the second electrode 26, both of which are supported by the dielectric substrate 22. The IDEs 24, 26 can be supported by the dielectric substrate 22 such as be depositing the IDEs 24, 26 on a surface of the dielectric substrate, as described herein. The first and second electrodes 24, 26 can include two individually addressable interdigitated comb-like electrode structures. In an example, the first and second electrodes 24, 26 can be direct printed on the dielectric substrate 2. The first and second electrodes 24, 26 can include the same materials as the first and second electrodes 4, 6 described in relation to sensor 10 of FIG. 1.

As shown in FIG. 2, the sensor 20 can include a humidity sensitive layer 28 configured to detect humidity of the environment in which the sensor 20 is located. That is, the humidity sensitive layer 28 can be in electrical contact with the IDEs, such that dielectric properties of the sensor 20 can vary based on the interaction between the humidity sensitive layer 28 and the first and second electrodes 24, 26. The humidity sensitive layer 28 can be formed of the composition of a cellulose acetate butyrate and a hydrophobic filler, as discussed herein. Further, the sensor 20, as shown, can include a dust protection layer 29. As shown in FIG. 2, in an example, the dust protection layer 29 can cover at least a top surface of the humidity sensitive layer 28. The dust protection layer 29 can be formed from the same materials as discussed in connection with the dust protection layer 12 of sensor 10 in FIG. 1.

Figure 3:
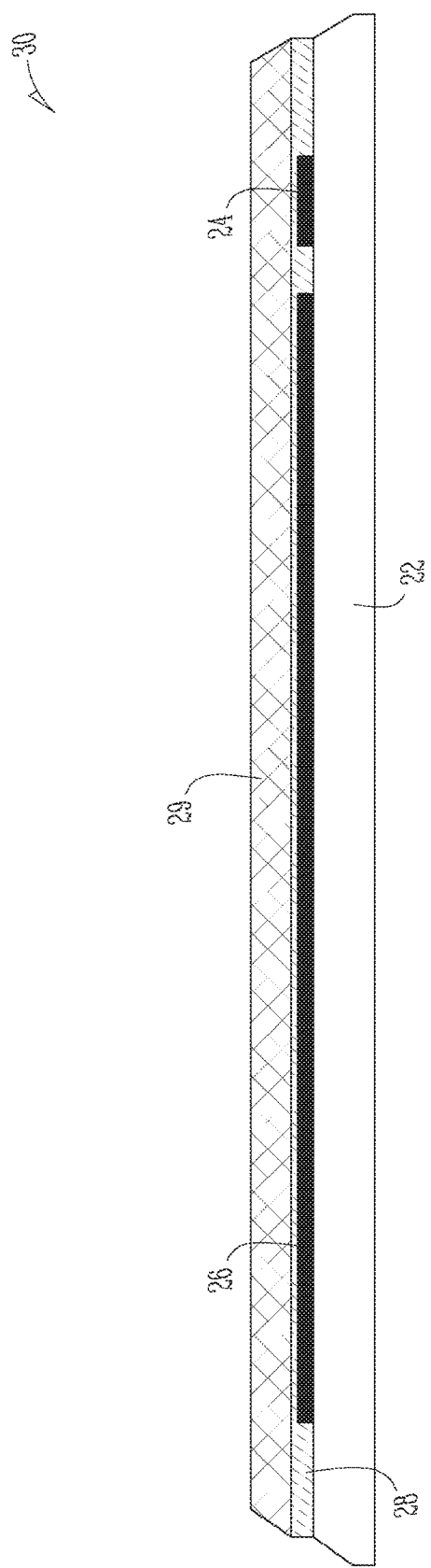
FIG. 3 shows a cross-sectional view of a relative humidity sensor, in accordance with at least one example.

FIG. 3 shows a cross-sectional view 30 of the sensor 20 in FIG. 2. The sensor can include the dielectric substrate 22. The dielectric substrate 22 can include the materials described above with respect to the dielectric substrate (e.g., 2, FIG. 1). The interdigitated electrodes, the first electrode 24 and the second electrode 26, can be deposited on the dielectric substrate 22, such as by a direct printing method. In an example, the humidity sensitive layer 28 can be deposited on the IDE so as to encompass the first and second electrodes 24, 26 and form a thin layer above the IDES 14A, 14B. As shown in FIG. 3, the sensor can include the dust protection film 29 above the humidity sensitive layer 28, as described herein.

Figure 4:
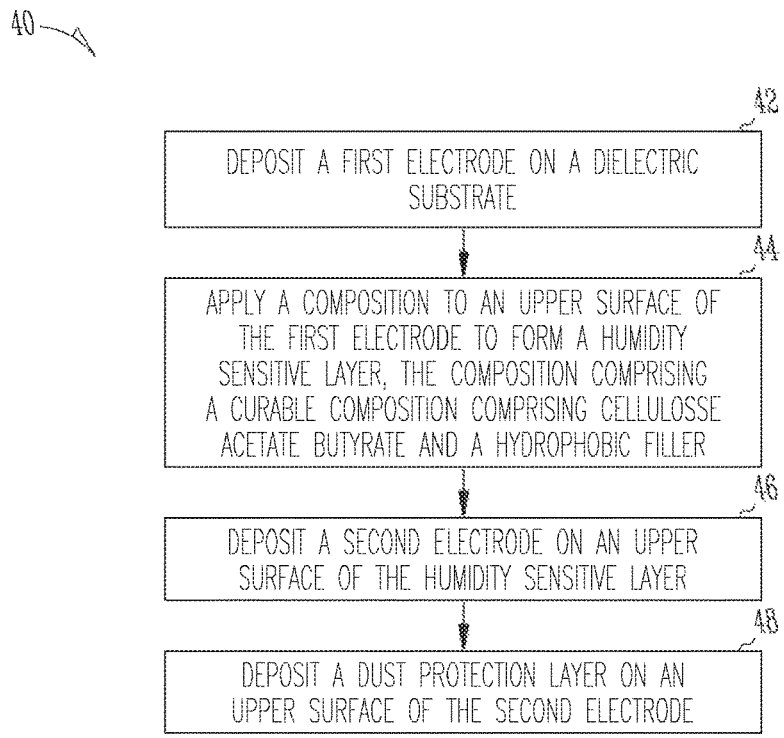
FIG. 4 shows a method of forming a relative humidity sensor, in accordance with at least one example.

FIG. 4 illustrates a method 40 of forming a relative humidity sensor, in accordance with at least one example. At 42, the method 40 can includes depositing a first electrode on a dielectric substrate, such as the dielectric substrate 2 of FIG. 1. The first electrode can include an electrode as described herein, such as the first electrode 4 of FIG. 1. In an example, depositing the first electrode can include direct printing. The method 40 can include applying a composition to an upper surface of the first electrode to form a humidity sensitive layer, at 44. The composition can include a cellulose acetate butyrate and a hydrophobic filler, as described herein. In an example, the composition can be prepared by dissolving the hydrophobic filler in a suitable solvent such as dimethylformamide (DMF), N-methylformamide (NMF) or combinations thereof. In such an example, the hydrophobic filler can include an organic compound, such as a lignin, as described herein.

At 46, the method 40 can include depositing a second electrode on an upper surface of the humidity sensitive layer, such as the second electrode 8 as described in relation to FIG. 1. In an example, the method 40 can include, but doesn't require, depositing a dust protection layer, such as the dust protection layer 12 of FIG. 1, on an upper surface of the second electrode, so as to form the relative humidity sensor.

Figure 5:
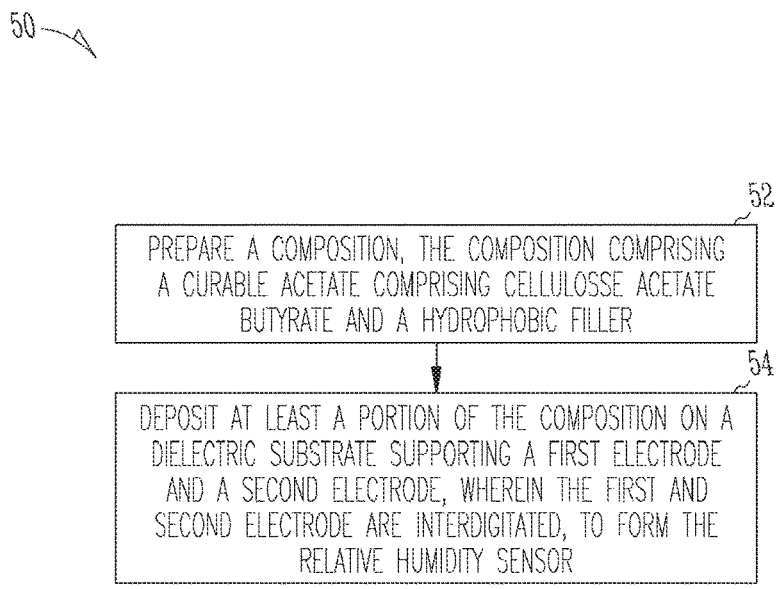
FIG. 5 shows a method of forming a relative humidity sensor, in accordance with at least one example.

FIG. 5 illustrates a method 50 of forming a humidity sensor, in accordance with at least one example. At 52, the method includes preparing a composition including a cellulose acetate butyrate and a hydrophobic filler. The composition prepared at 52 can be prepared by any method described herein, such as in relation to FIGS. 1-4. At 54, the method 50 can include depositing at least a portion of the composition on a dielectric substrate supporting a first electrode and a second electrode, wherein the first and the second electrode are interdigitated (24, 26 of FIG. 2), to form the relative humidity sensor (20 of FIG. 3). In an example, the method 50 can include depositing a dust protection layer on at least an upper surface of the second electrode, as described herein.

EXAMPLES

The examples described herein are intended solely to be illustrative, rather than predictive, and variations in the manufacturing and testing procedures can yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

Example 1

A silicon wafer which is exposed to thermal oxidation to develop an about 1 micrometer thick layer of thermal $SiO_2$. A thick layer of a Ti/Pt electrode (Ti/Pt) (e.g., 10 nm/400 nm) is deposited over the $Si/SiO_2$ wafer. The Ti/Pt electrode is then patterned to obtain a suitable geometry of the lower electrode.

One then prepares a cellulose acetate butyrate solution (10%) by dissolving cellulose acetate butyrate powder in ethyl alcohol. Wollastonite slurry (hydrophobic filler; 3%) was prepared from unmodified wollastonite and ethyl alcohol, ultrasonically stirred at room temperature, for 24 hours. The wollastonite slurry is then mixed with the cellulose acetate butyrate solution and the mixture is ultrasonically stirred at room temperature, for 24 hours.

The cellulose acetate butyrate solution comprising the wollastonite suspended therein can be spin-coated (5 to 500 rpm for 50 seconds) onto the lower electrode and placed in an oven to cure in air: 30 minutes at 150° C. The temperature was then slowly ramped down to room temperature.

A porous platinum electrode having a thickness of from about 20 to about 40 nm is then deposited and patterned on top of the cured cellulose acetate butyrate comprising wollastonite. In some embodiments, a cellulose acetate butyrate film can be spin coated on the surface of upper electrode, which acts as a dust removal thin film.

The above Detailed Description is intended to be illustrative, and not restrictive. For example, the above-described examples or one or more elements thereof may be used in combination with each other. Other embodiments may be used, such as by one of ordinary skill in the art upon reviewing the above description. In addition, various features or elements may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the phrase "varus/valgus angle" is used to refer to a varus angle only, a valgus angle only, or both a varus angle and a valgus angle.

In the appended claims, the terms "including" and "in which" are used as the plain-English equivalents of the respective terms "comprising" and "wherein." The terms "including" and "comprising" are open-ended, that is, a system or method that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

All publications, including non-patent literature (e.g., scientific journal articles), patent application publications, and patents mentioned in this specification are incorporated by reference as if each were specifically and individually indicated to be incorporated by reference.

The Abstract is provided to allow the reader to ascertain the nature of the technical disclosure quickly. It is submitted with the understanding that it will not be used to interpret or limit the scope or meaning of the claims.

What is claimed is:

1. A relative humidity sensor, comprising:
    a dielectric substrate;
    a first electrode and a second electrode disposed above the dielectric substrate; and
    a humidity sensitive layer disposed above at least one of the first electrode and the second electrode, the humidity sensitive layer comprising cellulose acetate butyrate and a hydrophobic filler;
    wherein the humidity sensitive layer comprises about 5 to about 10 weight percent hydrophobic filler based on the total weight of the humidity sensitive layer.

2. The relative humidity sensor of claim 1, further comprising a dust protection layer disposed above the humidity sensitive layer.

3. The relative humidity sensor of claim 2, wherein the dust protection layer is porous.

4. The relative humidity sensor of claim 1, wherein the hydrophobic filler is an organic compound.

5. The relative humidity sensor of claim 1, wherein the hydrophobic filler comprises lignin.

6. The relative humidity sensor of claim 5, wherein the lignin has an average molecular weight from about 500 and about 1000 grams/mol.

7. The relative humidity sensor of claim 1, wherein the hydrophobic filler is an inorganic compound.

8. The relative humidity sensor of claim 7, wherein the inorganic compounds comprises at least one of calcium carbonate, barium sulphate, talc, synthetic fluorine mica, wollastonite, and Viton.

9. The relative humidity sensor of claim 1, wherein the humidity sensitive layer is disposed above the first electrode and the second electrode is disposed above the humidity sensitive layer.

10. The relative humidity sensor of claim 1, wherein the first electrode and the second electrode are interdigitated and the humidity sensitive layer is disposed above the first electrode and the second electrode.

* * * * *